3 Sheets—Sheet 1.
I. ADAMS.
POWER PRINTING PRESS.
No. 546. Reissued Apr. 20, 1858.
6178X
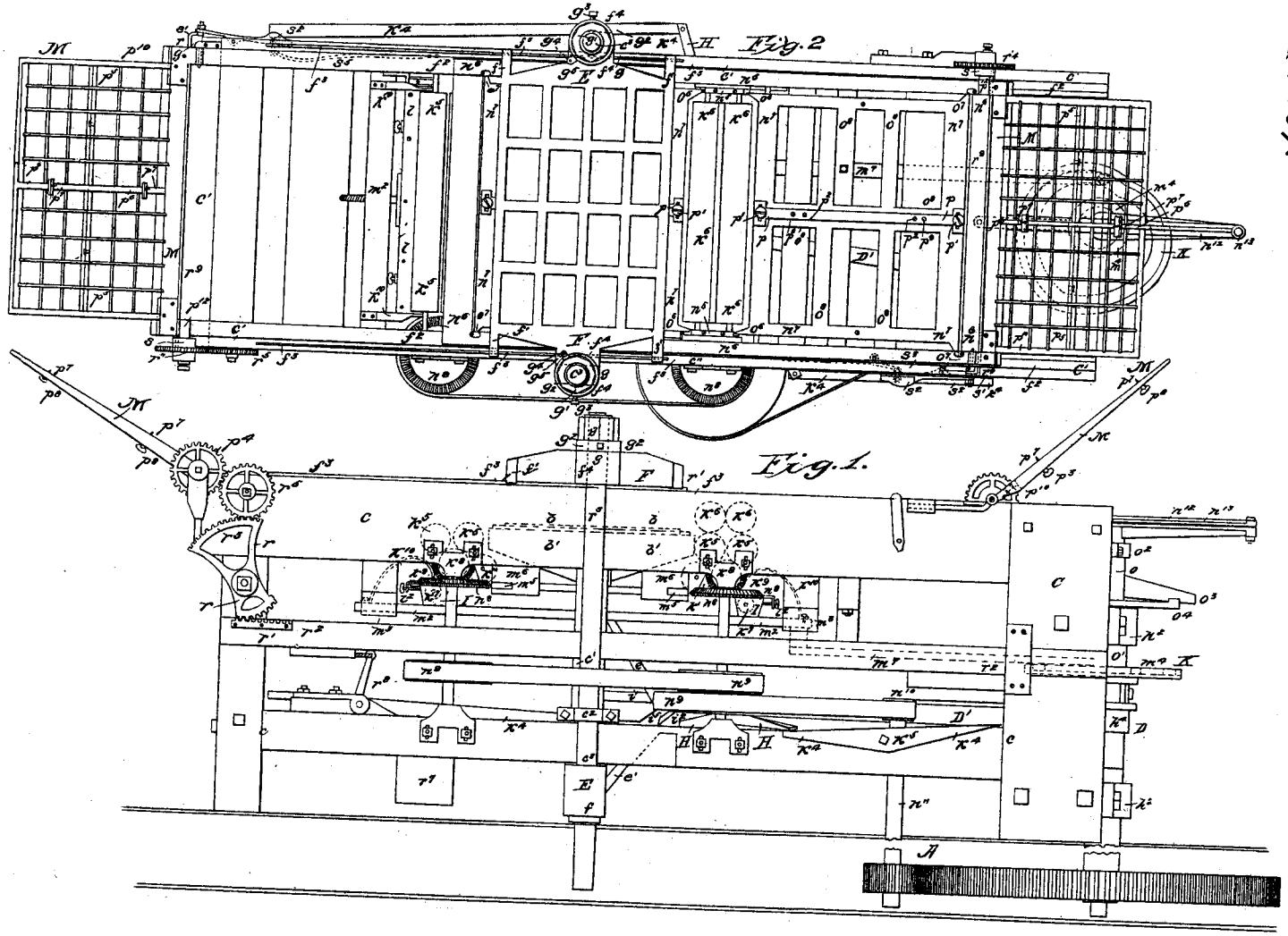

I. ADAMS.
POWER PRINTING PRESS.
No. 546.
Reissued Apr. 20, 1858.
6178X
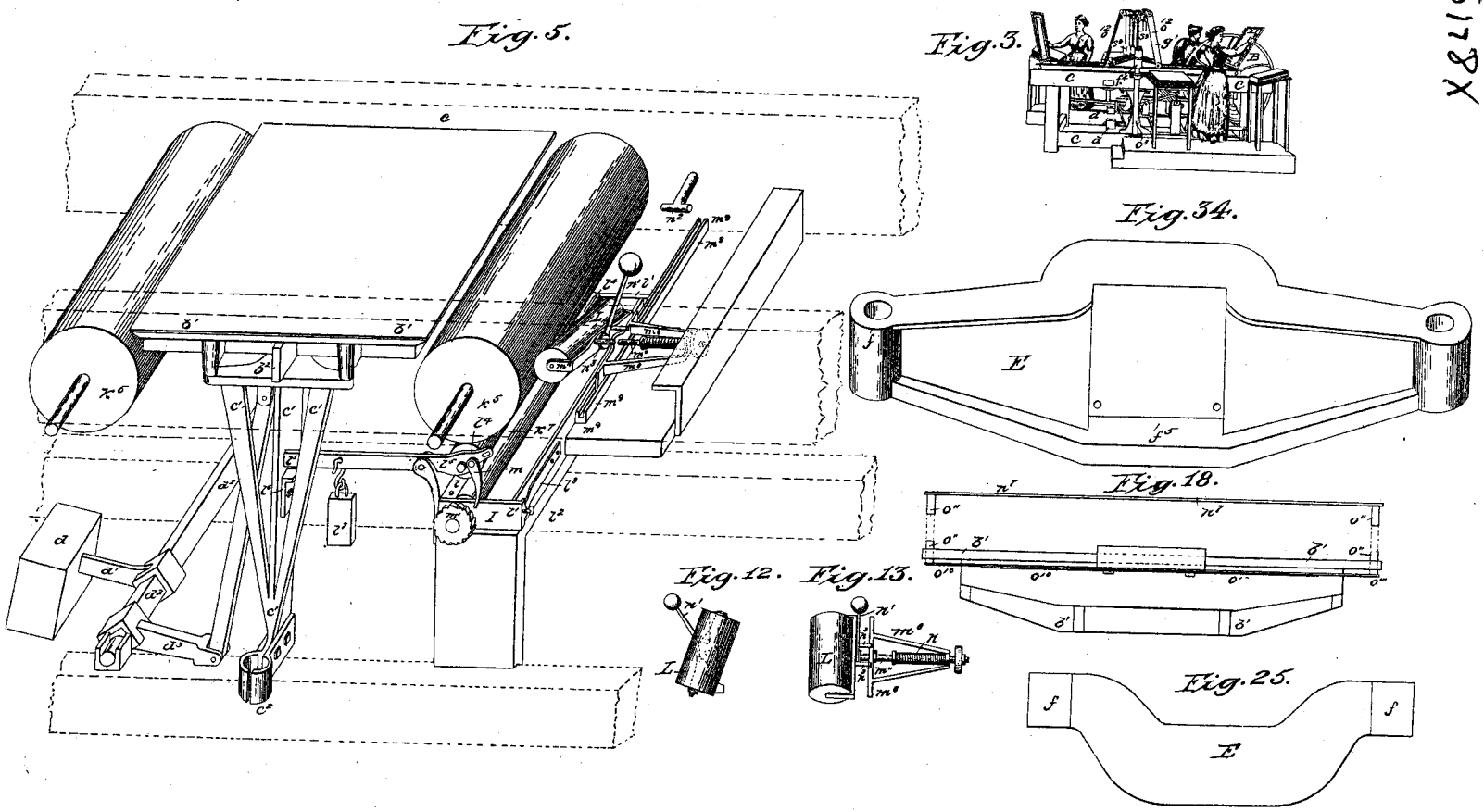

I. ADAMS.
POWER PRINTING PRESS.
No. 546.
6178X
Reissued Apr. 20, 1858
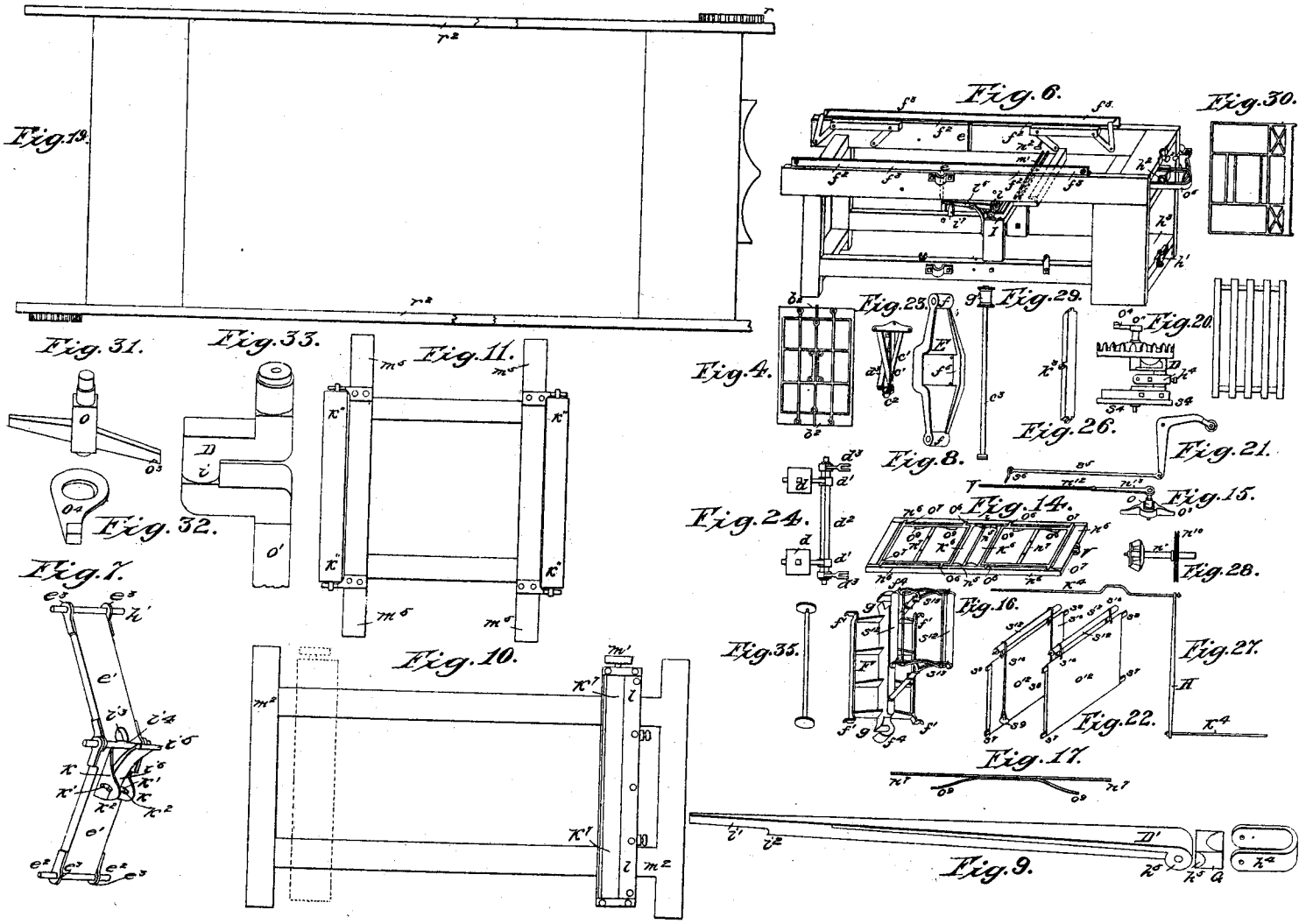

6178X

UNITED STATES PATENT OFFICE.

ISAAC ADAMS, OF BOSTON, MASSACHUSETTS.

IMPROVEMENT IN THE PRINTING-MACHINE CALLED A POWER PRINTING-PRESS.

Specification forming part of Letters Patent dated October 4, 1830; extended seven years; again extended by ac of Congress from August 16, 1856, to March 2, 1864; Reissue No. 546, dated April 20, 1858.

*To all whom it may concern:*

Be it known that I, ISAAC ADAMS, of Boston, in the county of Suffolk and State of Massachusetts, have invented a new and useful and Improved Printing-Machine, which I term a "Power Printing-Press;" and I do hereby declare that the same is described and represented in the following specification and the accompanying drawings, making a part of this specification, in which—

Figure 1 denotes a side elevation of such printing-press; Fig. 2, a top view of it; Fig. 3, an elevation, in perspective, of a press of this description.

The remaining figures are views of details, and will be hereinafter referred to and explained.

The drawings are not all made on the same scale, but the smallest are large enough for explanation.

The printing-machine embodying my said invention may be described as made up of four systems or aggregations of parts, each system being used for the performance of a distinct portion of the process of printing, as performed by the said machine—to wit, first, the distribution of the ink; second, feeding and registering the sheets to be printed; third, conveying the sheets into the press, or into that part of the machine where the impressions are to be produced; fourth, producing the impressions—each system or aggregation being so calculated and contrived within itself, and so connected and combined with each and all the others, that while it performs its office in a complete and distinct manner, all receive their appropriate motions from the same motive agent. Although some parts are in constant operation, while other parts move and stop, and have their periods of rest and motion alternately, the said systems severally complete the performance proper to each of them in consecutive order.

Fig. 1 is an elevation of the machine as made with the power to move it applied by means of a spur wheel and pinion, A, running horizontally below the flooring on which the machine stands. The pinion-shaft $n''$, Fig. 1, whether vertical or horizontal, may or ought to be provided with a fly-wheel.

Fig. 2 is a top view of the machine, and Fig. 3 is a perspective elevation of it on a small scale. In this figure the motive-power is shown as applied to a horizontal shaft, the main wheel upon the vertical shaft being a bevel gear (see also Fig. 20) and put on the shaft just above the crank, and being driven by a pinion (see Fig. 28) upon the horizontal driving-shaft carrying the fly-wheel B, Fig. 3. Such driving-shaft may be turned by any sufficient steady mechanical power; or it may be moved by manual power by the use of a winch or hand-crank.

C C C C, Fig. 1, and C′ C′ C′ C′, Fig. 2, denote the frame-work of the machine. The bed $b'$ $b'$, Figs. 1 and 5, on which the form of type rests, consists of a cast-iron plate, made sufficiently stiff and strong by the use of as little metal as practicable in the form of ribs which run in different directions upon its lower surface, as seen in Fig. 4, which is a view, on a small scale, of the under side of said bed. An end view of the bed, with the form of type $b$ $b$ upon it, is denoted by the dotted lines $b'$ $b'$, Fig. 1. The surface upon which the form rests should be nearly a perfect plane, although it should be slightly concave or depressed, to compensate for the yield of the metal, which is inevitable when impressions are being taken. When the press is in operation, the bed is caused to rise in order to produce impressions, and to sink down again to its resting-place in order to allow the ink-rollers to pass between it and the platen to impart ink to the types. The bed is kept in a horizontal position by means not only of the projections $b^2$ $b^2$, Figs. 4 and 5, arranged at its ends and made to slide in vertical grooves $e$ $e$, Fig. 6, formed in the opposite inner sides of the frame, but also by brackets $c'$ $c'$, Figs. 5 and 23, one end of each of which is secured to the under side of the bed, one at each end thereof. At the lower end of each of these brackets is a box, $c^2$. These boxes are made, respectively, to embrace the impression-bolts $c^3$, Figs. 1, 2, 3, and 29, upon which they slide up and down. Instead of such boxes, there may be projections at the lower ends of the brackets, which may slide in vertical grooves. The weight of the bed is counterbalanced by means of weights $d$ $d$, placed upon the levers $d'$ $d'$, Figs. 5 and 24, which are secured to the rocker-shaft $d^2$ $d^2$, and are connected with the bed by means of the rods $d^3$ $d^3$. The said rocker-shaft and levers being rigid, their connection with the bed serves to keep the bed level in one direction. The bed is raised and made to produce impressions by means of levers $e'$ $e'$, Figs. 1 and 7, called "toggle-joints," which levers may be operated by a cam; but for the operation of which I prefer to use a crank, D, and pitman or shackle-bar D′, Figs. 1 and 9.

Fig. 7 is a detached view of the toggle-joints; Fig. 20, the same of the impression-crank, and Fig. 9 the same of the said pitman. These toggle joints are hinged together, as seen in Fig. 7. They are also hinged to the bed and to the seat on which they rest by means of steel pins $h'$ $e^2$ and lugs $e^3$ $e^3$, the said seat on which said toggles rest being on a cross-bar or winter, E, Figs. 8, 25, and 34, of sufficient strength to sustain the impression. The winter is placed under the machine and connected at its two ends, $f$ $f$, with the platen by means of two vertical bolts, $c^3$ $c^3$, Figs. 1, 3, and 29.

Fig. 25 is an elevation of the bottom bar or winter, such as used in the press delineated by Fig. 1; but in order to avoid inconvenient height in the machine, the winter may be constructed as shown in the perspective view in Figs. 8 and 34—that is, with a ledge or shoulder, $f^5$, disposed near its lower edge, on which the lower end of the toggles may rest.

Letter F, Figs. 1, 2, and 16, denotes the platen, which is formed somewhat in the same manner as the bed—that is, with ribs or flanges to give it strength and stiffness. It should be constructed a little narrower and shorter than the bed, and should be provided with means at each corner—as, for instance, either projections $f'$ $f'$, as shown in Figs. 1 and 2, or rollers, such as shown in Fig. 35, for its support on the railways $f^3$ $f^3$ $f^3$. The platen has also two strong projections, $f^4$ $f^4$, with slots or recesses $g$ $g$ formed in their sides. The impression-bolts $c^3$ $c^3$, which connect the platen with the winter and sustain the vertical strain of the impression, pass through these recesses, which should be so formed as to allow the platen to be moved horizontally from over the bed, in order that the form of type may be conveniently put on, adjusted or taken off, as circumstances may require.

The impression-bolts $c^3$ $c^3$ are provided with strong nuts $g'$ $g'$, which go on the ends of said bolts with screws, by means of which the winter and platen may be adjusted at a greater or less distance from each other, in order to suit the impression to the work. Upon each of these nuts there is a hoop, $g^2$, the nut being prevented from turning within the hoop by a set-screw, $g^3$. From the lower edge of each of said hoops there is a projecting lip, $g^4$, having a hole through it corresponding with holes in the platen, such holes being for the purpose of receiving pins $g^5$, for maintaining the nuts as well as the platen in their respective places during the operation of the machine. They are also to insure the return of each nut to its true position after having been loosened for the temporary removal of the platen. When the impression is to be altered, the set-screws $g^3$ $g^3$ must be loosened or unscrewed, and the nuts $g'$ $g'$ turned as much as may be required, on the completion of which the said set-screws are again to be tightened without removing said pins $g^5$; but when the platen is to be moved laterally from over the bed the said pins must be taken out, while the set-screws remain tight. The nuts can then be turned back, so as to relieve the platen from any pressure and allow it to be moved away from over the type or form. When the platen is again brought to its place, the pin-holes in said hoops and the corresponding holes in the platen will serve as guides by which the nuts may be brought to the same positions they were in before being altered. By this contrivance of the nuts $g'$ $g'$, the hoops $g^2$, and the set-screws $g^3$, for increasing or diminishing the distance between the platen F and the winter E, I am enabled, with great ease and expedition, to insure the most accurate and delicate, and at the same time the most permanent, adjustment of the impression to be given to the printed sheets—a result of great value and importance in good printing. The toggle-joints are applied between the centers of the bed and winter. The crank D, by which the pitman and toggles are operated, is arranged with its shaft in a vertical position and so as to run in boxes $h^2$ $h^2$, Figs. 1 and 6, secured to the cross-bars at the end of the machine. The pitman D′, by means of which motion is transmitted from the crank to the toggle-joints, is attached to the crank D by a strap or shackle, $h^4$, Figs. 1, 9, and 20, through the ends of which and the rounded end $h^5$, Fig. 9, of the pitman, a pin is passed, the said end being made to rest in a concave seat, $h^6$, formed in the side of a box, G, Fig. 9, which is placed between the wrist or neck $i$, Fig. 33, of the crank and the end $h^5$ of the pitman. The whole together forms a double joint, by which not only is the box G allowed to turn freely on the crank, but the end $h^5$ of the pitman to work freely in the concave seat $h^6$, whereby the other end of the pitman is enabled to rise and fall with the center joint of the toggles against which it operates.

The bed $b'$ $b'$ is raised, the impression produced, and the said bed lowered down again, by little less than one-half of a revolution of the crank D, and on this account the said crank is made sufficiently eccentric to move the pitman a little more than twice as far toward the toggle-joints as it is necessary to move said joints; and a device is adopted by which the pitman is made to act on the toggle-joints only during a little less than one-half of its movement toward them while they are raising the bed up and producing the impression, and in only an equal proportion in its movement in the other direction in order to lower the bed down to its place of rest. The said device may be described as follows, to wit:

A portion, $i'$, of the pitman D′ is made narrower than the rest of it, so as to leave a shoulder, $i^2$, on its under edge, which, at the proper point in its motion toward the toggles, is pressed against the end of a lever, hereinafter called a "declension-lever," and by means thereof forces the toggles up to their effective position. The narrower end, $i'$, of said pitman moves through an opening, $i^3$, Fig. 7, in the upper toggle, and slides on the pin $i^4$ in the center joint of the toggles during that part of its movement in which they are not in motion. The toggle-joints are the least powerful in their action for raising the bed when the pitman first begins to operate upon them, and the pitman at the same time will be moving at its greatest velocity toward the toggles. In its backward or retiring movement, when lowering down the toggles and bed, said pitman will be moving at its greatest velocity at the moment when said toggles and bed arrive at their places of rest. Consequently a contrivance is necessary to prevent the injurious shocks and noise which would be produced by the sudden starting and stopping of the bed and other parts were the shoulders of the pitman allowed to impinge against the toggle pin $i^5$ without the intervention of any such device or contrivance as above referred to and hereinafter explained to modify such very objectionable effects. For these reasons I employ and arrange on the side of the lower toggle, $e'$, an instrument, $i^5$ $i^6$, Figs. 1 and 7, which I call a "declension-lever," against the upper end of which the shoulder $i^2$ of the pitman is made to operate in impelling forward the toggle-joints. The name of this lever is indicative of its nature, for, although almost infinitely powerful when it begins to act, it gradually decreases in power until its leverage terminates, and in lowering the toggles down the action of said lever is reversed.

Fig. 7, which is a perspective view or projection of the toggle-joints, shows the declension-lever $i^5$ $i^6$ as attached to the lower of them by means of the two flanges $k$ $k$, between which it is kept by the pin $k'$, which goes through the lower end of the lever and through the slots $k^2$ $k^2$, made in said flanges. Each of these slots stands in an oblique position toward the side of the toggles, in order that when the lower end of the declension-lever is thrown outward the slots, by means of said pin, may cause said lever to slip downward on said toggle about one-half of an inch in the course of its entire action. The lower end of the declension lever is thicker than any other part of it, and is rounded, so that when it is pressed between its resting place or fulcrum $k^3$, Fig. 26, and the side of the toggle the points of bearing which said toggle and fulcrum or resting-place have against the lever shall be exactly or nearly opposite each other. This lever is curved in its whole length, so that when its upper end is pressed forward the curved side of the lever rolls, as it were, up the side of the toggle, bringing in that way its bearing against the toggle gradually nearer and nearer to the upper end of the said lever, until the bearing against the toggle comes to be nearly opposite to the bearing of the shoulder of the pitman. When the shoulder of the pitman is pressed against the upper end of the declension-lever, the lever will be carried forward by the pitman, so that the toggles by such means will be forced gradually up toward a vertical position, the point of resistance gradually receding from opposite the fulcrum and approaching the upper end of the lever, as aforesaid, until its lower end leaves its bearing or fulcrum. When this takes place, the said lever will be carried along with the toggles until the impression is produced. When the toggle joints return to their place of rest, the declension-lever acts with a progressive power to bring the bed gradually to a state of rest.

Sometimes, when the machine is in operation, it is desirable to prevent an impression being given—as, for instance, when there is no sheet on the frisket; also when a sheet has been inaccurately placed or pointed. To do this a bar, H, Figs. 1, 2, and 27, is put across the machine under the pitman D′, and there is a treadle, $k^4$, Figs. 1 and 2, on each side of the machine, one treadle being attached to each end of said bar, and said treadle being hung on a pivot, as at $k^5$, Fig. 1, in a convenient position to enable the person feeding the sheets, at either end of the machine, by pressing his or her foot on the treadle, to raise the pitman D′ sufficiently high to allow its shoulder $i^2$ to pass over, when the pitman is impelled forward clear of the declension-lever without moving either the latter or the toggle-joints.

The distribution of the ink is performed by means of the rolling together of the surfaces of cylinders or rollers, a set of which I place at each side of the bed, as denoted by the dotted lines $k^5$ $k^5$ $k^5$ $k^8$ $k^3$ in Figs. 1 and 5, each set being furnished with an ink-fountain, I, Figs. 1 and 5, though one fountain will answer, as shown in Fig. 5.

In an arrangement such as represented in Fig. 1 the cylinders $k^5$ $k^5$ $k^5$ $k^5$ are composed of metal or wood; but the rollers $k^8$ $k^8$ are furnished with elastic surfaces. Two cylinders of wood or metal may be u ed, as $k^5$ $k^5$, Fig. 5—one on each side of the bed—instead of the four cylinders $k^5$ $k^5$ $k^5$ $k^5$, as seen in Fig. 1.

The ink-fountain consists of a trough with a fountain-roller, $k^7$, lying in the trough, with the upper side of the roller a little above the level of the sides of the trough. In order to control and graduate the quantity of ink drawn from the fountain by the fountain-roller, a scraper, $l$, Figs. 5 and 10, with a thin edge fitted to the fountain-roller is screwed onto the fountain with the thin edge against the fountain-roller. The holes which the screws are put through to hold the scraper to the side of the fountain may be made oblong crosswise of the fountain, so that the scraper may be adjusted to the right distance from the fountain-roller to allow the proper quantity or thickness of ink to be brought out of the fountain and upon the surface of the fountain roller. Instead of the scraper being made adjustable, the fountain-roller may be made so by applying the plates $l'$, Fig. 5, which have bearings in them for the journals of the fountain roller, in such manner that they may be moved by means of the screws $l^2$ and the springs $l^3$, Fig. 5. The ink may be taken from the fountain-roller and conveyed to the distribution-cylinders by causing the composition dip-rollers $l^4$, Fig. 5, to sink down onto the fountain-roller $k^7$, from which it will take a small quantity of ink by adhesion, and then return to the distribution-cylinders $k^5$ $k^5$, which, being in a state of rotation, will receive the ink thus taken from the fountain and distribute it upon their surfaces and communicate it to the inking rollers or cylinders $k^6$ $k^6$, by means of which the types are inked. The movement of the dip roller $l^4$, Fig. 5, is produced by means of a lever, $l^5$, one such lever being placed at each end of it. In these levers are the bearings of the journals of said dip-rollers, and said levers are moved as follows: Projecting pieces $l^6$ are bolted to the brackets $c'$, as shown in Fig. 5. These pieces $l^6$ form shoulders by which the said levers $l^5$ $l^5$—when the bed rises—are moved so as to force the dip rollers down upon the fountain-roller, as aforesaid. Said dip-rollers are raised by means of a weight, $l^7$, applied to each lever $l^5$. In this arrangement the fountain-roller is turned by means of a pawl or click, $m$, attached to one of the said levers and operating on the ratchet-wheel $m'$ on the end of the journal of said roller. When the arrangement is such as represented in Fig. 1, the ink may be conveyed from the fountain, as follows, viz: The fountains in this case are placed on a sliding frame, $m^2$, (see a detached view of it in Fig. 10,) which is located, as shown in Fig. 1, and so as to bring the fountain-rollers under and parallel with the rollers $k^8$ $k^8$; said sliding frame moves in bearings $m^3$ $m^3$ Fig. 1, attached to the frame-work of the machine, and it, with the fountains upon it, is made to slide horizontally to and fro in the direction of the length of the machine by means of grooved cam, $m^4$, which is secured to the crank-shaft, and acts on a projection or roller secured to the under side of a bar or rod attached to the said sliding frame and sliding lengthwise in a box attached to a cross-bar of the frame of the machine and near to said projection or roller. This grooved cam should be so formed as to move the fountains about one inch each way, and the time of performing each movement should be equal to about one-twelfth of a revolution of the cam, the intervals of rest between the reciprocations being each equal to about five-twelfths of such revolution. The fountain rollers in this arrangement are turned by pawls or clicks which are attached to the stationary-frame-work and made to act upon the ratchet-wheel $m$ on the end of one journal of each fountain-roller, the action being produced by the movements of the fountains. The ink is taken from the fountain-rollers and communicated to the rollers $k^8$ $k^8$ by means of the rollers $k^9$ $k^9$, Fig. 1, which bear upon said fountain-rollers, their journals running in bearings made in the ends of the curved springs $k^{10}$ $k^{10}$, Fig. 1, the lower ends of which springs are secured to the said sliding frame. In order to lift the said rollers from the fountain-rollers and bring them against the rollers $k^8$ $k^8$, studs may be employed to project from the sides of the main frame, inside of the curve of said springs, and in such position that when the springs are moved toward the distribution-rollers by the movement of the slide-frame the said studs may come in contact with the said springs and cause their ends to rise, and thus to elevate the rollers $k^9$ $k^9$ until they press against the rollers $k^8$ $k^8$, which, being in a state of rotation, will receive and distribute the ink thus brought to them, as in the first-described arrangement.

To preserve an even "color" of the printing it is necessary that the ink should be distributed laterally, or lengthwise of the rollers, as well as in the direction of the motion of the cylinders. This may be done in two ways: First, by means of rollers $k^{11}$ $k^{11}$, Figs. 1 and 11, applied parallel-wise against the rollers $k^8$ $k^8$, and made to move in the direction of their length, as well as to revolve with the other rollers. I call these rollers "vibrating rollers," and they may be hung in bearings in a frame, as shown in Fig. 11, such frame being placed in the machine with the projecting parts $m^5$, $m^5$ $m^5$ $m^5$ resting in bearings, or boxes, such as denoted at $m^6$ $m^6$, Fig. 1, in which they slide when the rollers are vibrated. A reciprocating or vibrating motion is given to this frame, and the vibrating rollers, by means of a heart-shaped grooved cam, K, Fig. 1, which cam is secured to the crank-shaft, and actuates a lever, $m^7$, Fig. 1, one end of which is attached to said frame, and the other end of which has a projection or roller on its under side, which enters the said heart-shaped groove, the fulcrum of the lever being about midway of its length. The other method of distributing the ink laterally is by means of a roller, which I call a "traveling-roller"—such as denoted at L, Figs. 5, 12, and 13—which by its oblique bearing against the cylinders $k^5$ is made to travel from end to end of the same, its motion along the cylinder being reversed at each end thereof, and this reversal being caused by the reversal of its oblique position. The surface of said traveling roller should be elastic, and may be made of a substance composed of glue and molasses.

Letters $m^8$ $m^8$, Fig. 5, denote the carriage on which the traveling roller L is mounted, and $m^9$ $m^9$ exhibit a grooved railway on which such carriage travels. The traveling roller revolves on a small rod in a frame, $m^{10}$, which is secured to the end of a spindle or rocker-shaft, $m^{11}$. The spindle rests in bearings made in the carriage $m^8$. Letter $n$ is a spiral spring which forces the roller L against the cylinder $k^5$.

$n'$ is a weighted lever, by means of which the position of the traveling roller is changed, as follows: Supposing the cylinder $k^5$ to be in motion, its upper surface moving toward the traveling roller, and the said traveling roller being in contact with it, as seen in Fig. 5, the said traveling roller will then advance toward the right-hand end of the cylinder $k^5$ until the lever $n'$ shall be brought in contact with the stop $n^2$, which projects from the side of the frame, there being one such stop at each end of the cylinder $k^5$, when, by the continued advancement of the traveling roller toward the said stop, the said weighted lever $n'$ will be elevated and pressed over until its center of gravity shall be thrown over to the opposite side of the spindle $m^{11}$. This having taken place, the said weight will cause the said lever to fall, and, in its descent being brought against the stud $n^3$, said lever will turn the spindle $m^{11}$, by which means the oblique position of the traveling roller against the cylinder $k^5$ will be so changed as to cause it to move toward the other end of the said cylinder, where, when it arrives, the said weighted lever will meet with another stop—such as $n^2$—which in its turn will reverse the oblique position of the traveling roller, in manner aforesaid, to the position shown in the drawings. Either or both of these modes of lateral distribution may be used; and with either or both of these devices, in combination with the adjustable scraper $l$ and the fountain-roller $k^7$, I am enabled to produce and constantly maintain during an unlimited period of time and throughout the largest editions of the most voluminous works, a very perfect equalization and distribution of ink over the entire surface of the inking rollers $k^6$ $k^6$, and thus secure remarkable uniformity and perfection in the color and character of the printing done on my machine.

For the purpose of taking the ink from the distribution-cylinders $k^5$ $k^5$ and laying it upon the surface of the types, there are two other rollers, $k^6$ $k^6$, Figs. 1 and 14, whose surfaces are composed of an elastic substance—such as before named—and which, after having been rolled upon the cylinders $k^5$ $k^5$ to receive ink from them, are rolled over the form of type and passed between the bed and platen, from the distribution-cylinders on one side of the bed to those on the other side thereof, where they again receive a contribution of ink. These rollers are supported by their journals in boxes $n^5$ $n^5$, Fig. 2, secured to the side rails of the frame $n^6$ $n^6$, Figs. 2 and 14, which frame I call a "frisket-carriage." Fig. 14 is a detached perspective view of a carriage of this kind with friskets $n^7$ $n^7$ and the inking-rollers $k^6$ $k^6$ mounted upon it. In my drawings I have shown only two inking-rollers mounted on the frisket-carriage; but I do not limit myself to this number, as the carriage may be made to carry four, six, or any desired number of inking-rollers. The inking-roller boxes $n^5$ $n^5$, Fig. 2, should be made adjustable vertically, so that they may be set at a proper height to give the inking-rollers a suitable pressure upon the form while they are being rolled over it. It is well, also, that the inking-rollers should be held down by springs, in order that in case of either of the rollers being untrue or eccentric, or in case of being set too low, it shall be capable of rising and falling, while at the same time it can maintain a proper degree of pressure upon the types. This object may be attained by loading the rollers with a solid metallic shaft, instead of rising springs, there being room made in the boxes of their journals to allow the journals of the inking-rollers to rise and fall.

The distribution-rollers, as in Fig. 1, may be rotated by means of the bevel-gears $n^8$ $n^8$, which are propelled by means of the pulleys and bands $n^9$ $n^9$, which receive motion from a pulley, $n^{10}$, fixed on the pinion shaft $n^{11}$, or, in case the pinion-shaft $n^{11}$ shall be placed in a horizontal position, as in Fig. 3, (see also Fig. 28,) in order that it may be conveniently turned by hand as well as by other power, one cylinder being used on each side of the bed, as in Fig. 5, instead of two, as in Fig. 1, the said bevel-gears may be dispensed with, and the said cylinders $k^5$ $k^5$ may be rotated by means of a band running from a pulley, $n^{10}$, Fig. 28, on the said pinion-shaft to a pulley on the end of the shaft of the nearest cylinder $k^5$, Fig. 5, the other cylinder $k^5$ being rotated by means of a pulley on its shaft and by a band running from a second pulley on the shaft of the said nearest cylinder. The frisket-carriage slides in rabbets $f^2 f^2 f^2 f^2$ in the upper part of the main frame, as seen in Fig. 2; or, instead of said rabbets, ways for the said carriage may be formed in iron rails, which may be secured on the frame, as in $f^2$ $f^2$ $f^2$ $f^2$, Fig. 6. The rollers $k^6$ $k^6$, being mounted in the frisket-carriage $n^6$, are moved by it over the form, from the distribution rollers on one side of the bed to those on the other side, and the said frisket-carriage is operated and caused to have its proper periods of motion and rest by the following means, viz: A crank, $n^{13}$ $n^{13}$, Figs. 1 and 2, (see also Fig. 15,) and a connecting-rod, $n^{12}$, are used to produce the motion, said connecting-rod $n^{12}$ being attached to the end of the frisket carriage. Letters V, Figs. 14 and 15, show the points of connection between the said connecting-rod and said frisket-carriage. The crank $n^{13}$ is secured to the top end of a short shaft, $o$, Figs. 15 and 31, whose pivot has a step or bearing in the top end of the crank-shaft $o'$, Figs. 20 and 33. The upper end of the shaft turns in boxes $o^2$, secured to the cross-ties of the frame. The crank $n^{13}$ is made to move successively to the extent of half a revolution at a time, the same being for the purpose of giving the frisket-carriage, inking-rollers, and friskets their motions in either direction, and is allowed times of rest between the periods of motion equal to the times of motion. These times of rest are for the purpose of allowing the inking-rollers $k^6$ $k^6$ to receive a fresh charge and distribution of ink, and to afford time for the bed to rise, in order to produce the impressions and fall again to its resting place. To produce these periods of motion and rest, a rocking bar, $o^3$, Figs. 1, 15, and 31, is secured to the shaft $o$ by means of a pin, which is put through the shaft and the center of the rocking bar; or said bar may be put through a mortise in said shaft, or said shaft may be put through a mortise in said bar, in such manner as to allow said bar to swivel on the pin, so that its ends may move a short distance up and down. To rotate this bar, and by that means the shaft $o$ and crank $n^{13}$, there is an arm, $o^4$, Figs. 1, 20, and 32, secured to the upper end of the crank-shaft $o'$, by which it is caused to rotate horizontally. At the end of the said arm $o^4$ there is an upward projection, which comes in contact with the outer end of the rocking bar and carries it around one half of a revolution, when, by means of a stationary cam or inclined plane, the said end of said rocking bar will be relieved from the action of said arm by being raised up so as to allow the projection on the end of the arm $o^4$ to pass on under the said end of the rocking bar, and allow it, with the shaft $o$ and the crank $n^{13}$, to stop until the arm $o^4$ shall have performed the other half of its revolution. This done, the said projection on the arm will strike the other end of the rocking bar, and carry it, with the crank $n^{13}$, around another half of a revolution. The said stationary cam will then again disengage the rocking bar from the arm $o^4$, and the said crank and the parts attached will have another period of rest, and so on, alternately. The stationary cam or inclined plane may be barely long enough to serve the purpose of disengaging the ends of the rocking bar from the arm which moves it, and it may be secured to a cross-piece of the frame of the machine, and in a situation to act against the under side of the end of the rocking bar successively, in order to disengage it, as aforesaid; or the said inclined plane may be formed on the edge of a hoop, $o^5$, Fig. 6, or ring within which the arm $o^4$ may revolve.

To make sure of the stoppage of the crank $n^{13}$ the moment the bar $o^3$ is relieved from the action of the arm $o^4$, it is well to apply some obstruction to the said bar $o^3$ which shall act at the moment of disengagement. This can be done by so constructing and arranging the parts—the rocking bar and the shaft $o$—that the ends of said bar can only rise up to a certain point, and then making the upper part of said inclined plane so high that neither end of the said rocking bar can pass the most prominent part of the inclined plane without some friction; or the same object may be effected by placing a spring over the outer end of the rocking bar at a point opposite to that where the other end is disengaged, in such manner as, at the moment of disengagement, to cause the bar to fall into a slight notch made on the edge of said ring $o^5$. In this case, by means of a cam or inclined plane on the arm $o^4$, the bar may be disengaged from the notch the instant before it is to be impelled forward by the said arm.

In order to carry the paper into the press, to sustain it while the bed is being raised for the purpose of producing the impression, to separate the paper from the type after the impression has been given, and to bring the paper out of the press, there are frames $n^7$ $n^7$ $n^7$ $n^7$, Figs. 2 and 14, suspended on the frisket-carriage $n^6$ by pivots or journals at the corners $o^7$ $o^7$ $o^7$ $o^7$ of said frames, the inner corners, $o^6$ $o^6$, being supported on projections from the side rails of the frisket-carriage, as seen in Fig. 2; or they may be supported as seen in Fig. 14. The boxes in which the pivots $o^7$ $o^7$ rest should be so made as to allow the friskets to rise and fall a little when the impressions are produced, and the pivots may be prevented from being thrown out of their boxes by slides, catches, or other suitable means. The friskets generally consist of an outer quadrangular frame of flat iron furnished with cross-bars $o^8$ $o^8$ $o^8$ $o^8$ $o^8$ $o^8$, Fig. 2, which come between the pages or divisions of the type or forms and under the margins and blank spaces of the printed sheets, which they serve to support and separate from the types immediately after the production of an impression. The cross-bars are often formed of strong paper pasted to the quadrangular frisket-frames; but they may be formed of thin iron, twine, webbing, or in any other way which may serve the purposes aforesaid, deflection or bagging being avoided. When the cross-bars $o^8$ $o^8$ are made of a material which will allow of it, they should be curved upward a little, in order to bring the sheets of paper to be printed firmly against the platen before the types are brought in contact with them. This prevents the "slurring" which would be produced by allowing the paper to dangle over the type either immediately before or after the impression. When the said cross bars $o^8$ $o^8$ are made of paper, it is customary for printers to put rolls of paper or pieces of cork on the said cross-bars, in order to compensate for the yielding character of the paper, and to cause the sheets to be pressed firmly against the platen a short time before and after the impressions.

The better to effect the above-named object of holding the sheets firmly against the platen from a little time before the types are brought up against them until after they are impressed and separated from the types, I apply springs $o^9$ $o^9$, Figs. 14 and 17, to the under sides of the friskets. These springs may be made of plates of steel bent in a curved form, as denoted in Fig. 17, and in that case may be screwed or riveted to the under side of the friskets—one spring on each of the two opposite sides—they being made of such length and placed in such a position that their ends, soon after the bed commences to rise upward, shall take bearings upon the bed or upon the chase or other part provided for the purpose. By such means the friskets are made to press the sheets against the platen before they are touched by the types, and are made to hold them there firmly until the types are separated from them. Instead of the above mode of using said springs for pressing the friskets against the platen, springs of any sort having the required elasticity and strength may be secured to the bed below the surface of the form, as shown, for instance, at $o^{10}$ $o^{10}$ $o^{10}$ $o^{10}$, Fig. 18, in which $b'$ $b'$ denote the edge of the bed toward the crank $n^{13}$, there being provided small studs $o^{11}$ $o^{11}$, projecting downward from the friskets sufficiently to take bearings upon other studs which stand upon the said springs and soon enough to secure the operation aforesaid. The foregoing are the requisites proper to the instruments used to support the paper to be printed and to separate the sheets from the types after such sheets have received impressions; but any other construction of the mechanism which in different circumstances may be found convenient and which may possess the said requisites may be employed. The cross-bars or point-rods $p$ $p$ are made of thin iron or steel, and they are secured to the friskets by means of screws $p'$ $p'$, the said screws being screwed into the frisket-frames and made to pass through slots formed crosswise of the rods, so as to allow of their adjustment in that direction. Two points, $p^2$ $p^2$, by means of which the printing is to be made to "register," are secured to each of these rods. The said points, in order to prevent their being pressed too hard against the face of the platen, may be fixed to the end of short flat springs, and such springs may be fastened to the under sides of the point-rods in such manner that the points may be caused to project through holes in the rod $p$ $p$ sufficiently to serve the purpose of registering the sheets. The flat springs should be sufficiently elastic to allow the points to be pressed down even with the surface of the rod without being injured.

In registering it is sometimes necessary that the points should be arranged so as to range with each other across the friskets, in a direction at right angles with the direction in which they are shown to range in Fig. 2. The sheets to be printed may be pointed directly upon the friskets; but in that case a loss of time will occur on account of the friskets being about one-half of the time between the bed and platen, during which time the person who feeds the sheets can do nothing toward pointing the sheets on the friskets. To remedy this loss of time I make two feed or register frames, M M, Figs. 1 and 2—one for each end of the machine—and hinge them to the frame-work in such positions that when either frisket is out and at rest in the proper situation to receive a sheet the adjacent feed-frame may be turned down upon it and made to deposit there in the proper place the sheet previously printed or registered upon the said feed-frame. Said feed-frames should be formed of some kind of open-work—such, for instance, as at M M, Fig. 2; or frames such as shown at Fig. 30 may be used and covered with a coarse net-work. This mode of forming the feed frames is to prevent them, when lifted immediately after depositing sheets on the friskets, from lifting or disturbing said sheets or causing them to move from their places by suction or a movement of the surrounding air. A part of each of the said feed-frames consists of cross-bars $p^5$ $p^5$ $p^5$ $p^5$ $p^6$ $p^6$ $p^6$ $p^6$. Points $p^7$ $p^7$ $p^7$ $p^7$, to register the sheets of paper, are secured to these bars in such manner as to permit their being adjusted in the same direction as the points upon the friskets. The two points to be used on either feed-frame at any given time should be those which will range with each other in the same direction as those used on the friskets. They may be secured to small slides having in their transverse sections the form of a dovetail. The said slides may be inserted in grooves made to fit them crosswise in the cross-bars $p^5$ $p^6$. The slides are secured from slipping, and at the same time made adjustable, by means of set-screws $p^8$ $p^8$, which are put through plates of metal on the back sides of said cross-bars, and in such positions that their points may be made to bear against said slides. To prevent moving these points upon the point-rods of the friskets, holes $p^9$ $p^9$ $p^9$ $p^9$ are made in the said point-rods, into which the points on the feed-frames enter whenever either feed-frame is turned down upon the frisket in order to deposit a sheet of paper thereon.

The feed-frames are advantageously operated by the person who points the sheets, he or she for that purpose taking hold of the said feed-frame with the right hand at or near $p^{10}$. These feed-frames, however, may be operated by the mechanism of the machine, which may be described as follows: A toothed wheel, $p^{11}$ $r^4$, Figs. 1 and 2, is put upon a short shaft, $p^{12}$, by which each of the said feed frames is hinged at one corner to the frame of the machine. These wheels $p^{11}$ $r^4$ are operated by by means of levers $r$, on the lower end of each of which there is a section of a toothed wheel, which is actuated by the racks $r'$ $r'$, Fig. 19, which are attached to slides $r^2$ $r^2$, one on each side of the machine. On the other ends of said levers there are other sections of toothed wheels, $r^3$, one of which gears directly into and actuates the wheel $r^4$; but the section $r^3$ actuates the intermediate wheel, $r^5$, and this intermediate gear actuates the wheel $p^{11}$. The reason for using an intermediate wheel with one of the feed frames and not with the other is, that the feed-frames, in delivering sheets, move in opposite directions, each toward the other, while both the racks $r'$ $r'$, by means of which the said feed-frames are moved when turning said feed-frames down, act in one direction. The slides $r^2$ $r^2$ are connected together by cross-bars, and are caused to move in one direction by means of a friction-roller, which is attached to the crank D, the said roller, when carried around by the rotation of the said crank, being made to act against a cam formed on the edge of one of the cross-bars which connect the said slides. This cam and friction-roller may be transposed—that is to say, the cam may be put on the crank-shaft and the friction-roller may be attached to the said cross-bar. The slides $r^2$ $r^2$ are moved in the other direction by means of the weight $r^7$, Fig. 1, and crooked lever $r^8$. To prevent both of the said feed-frames from being turned down at the same time, the toothed wheels $p^{11}$ $r^4$ are so put on the shafts $p^{12}$ $p^{12}$ as to turn freely upon them. A small steel rod, $r^9$ $r^9$ $r^9$ $r^9$, Fig. 2, is placed along the lower edge of each of the said feed-frames. One end of each of these rods passes through a small flange or collar, $s$ $s$, on each of the said shafts, and when either of the said feed-frames is to be operated the end of the rod which belongs to that feed-frame is made to enter a hole in the hub or nave of the wheel on the shaft of said feed-frame, so that when the said wheel shall be turned, it being thus clutched to the shaft of said feed-frame, it will carry the feed-frame down for the delivery of a sheet. The other ends, $s'$ $s'$, of the said rods are bent down so as to connect with the levers $s^2$ $s^2$ at points in lines running through the centers of the pivots by which the feed-frames are hinged to the machine. The fulcra of these levers $s^2$ $s^2$ are about midway of their length, and they are attached to springs $s^3$ $s^3$, which serve, by means of said levers, to draw the ends of the rods $r^9$ $r^9$ from the holes in the hubs of the wheels $p^{11}$ $r^4$, so as to allow the said wheels to turn without moving the feed frames during such portions of time as they are required to remain stationary to afford time for the sheets to be pointed upon them. When the frisket-carriage is moved to either end of the machine—as, for instance, to that end where the toothed wheel $p^{11}$ is situated—a friction-roller, one of which is secured in each side of said carriage, is made to act against the spring $s^3$ and press it back so as to cause the lever $s^2$, to the end of which said spring is attached, by means of the rod $r^9$, to clutch the said wheel $p^{11}$ to the shaft $p^{12}$ of the feed-frame, and by such means secure the movement of the said feed-frame at the time the frisket is near to it and in position to receive the paper to be printed, the motion of the racks $r'$ being so timed as to cause the wheels $p^{11}$ $r^4$ to move for the purpose of moving the said feed-frames at the proper time. Each of the springs $s^3$ $s^3$ should be of considerable length, and the points where the friction-rollers bear against them when the friskets receive sheets from the feed-frames, should be so far from the ends connected with the levers $s^2$ $s^2$ as to allow of sufficient elasticity to permit the ends of the said levers to be pressed inward so as to unclutch the wheels $p^{11}$ $r^4$ from the shafts $p^{12}$ $p^{12}$, thus furnishing the means of preventing the feed-frames from moving, whenever the same shall be desirable. Instead of the said friction-rollers, projections may be formed on the sides of the frisket-carriage to act against the said springs.

In order to secure the return of the bed to its place of rest regularly after impressions shall have been produced the pitman, which operates the toggle-joints should be so made as not to force them so near to a vertical line but that the elastic force of the parts upon which the stress of the impression comes will be sufficient, by their reaction, combined with the weight of the bed, to force the said bed to descend and the toggle-joints to follow the pitman in its backward movement until they come to their place of rest. In order to secure greater certainty to this operation, a cam, $s^4$, Fig. 20, of the proper form may be put on the lower part of the impression-crank D, and be made to draw the toggles back to their place of rest by actuating a crooked lever—such as shown in Fig. 21—connected to the said toggles by means of a rod, $s^5$, and an eyebolt, $s^6$, Fig. 21.

The blanketing usually employed to cover the face of the platen and to insure the degree of softness or elasticity which is necessary to the production of even impressions on the paper may be secured in a frame covered on one side with parchment or fine cloth, somewhat in the manner of the tympan of a hand printing-press, the said frame being so made as to surround the edge of the platen and be secured thereto by means of slide-bolts or some other convenient fastening. The blankets may be placed between the covering of the said frame and the face of the platen; or the blankets $o^{21}$ $o^{12}$ may be arranged as shown in Fig. 3, (see also Figs. 16 and 22,) there being in this case two blankets—one at each side of the platen—and the edge of one being secured to the frisket-carriage by means of a rod, $s^7$, arranged between the edge of one frisket and the inking-rollers $k^6$ $k^6$, and the other being secured to said carriage in the same manner between the other frisket and the said inking-rollers. The edge of each blanket opposite to the edge secured to the frisket-carriage may be secured to a rod, $s^8$ $s^8$, by which each blanket may be drawn up vertically, as the frisket to which it belongs is brought out from between the bed and platen, by means of cords $s^{10}$ $s^{10}$ $s^{10}$ $s^{10}$, having weights $s^9$, the said cords running over the rollers $s^{12}$ $s^{12}$, which are hung in the frame work $s^{13}$ $s^{13}$, mounted on the platen, as shown in Fig. 16. There may be a small roller at each edge of the platen, hung on springs, to prevent the blankets from rubbing against the edges of the platen. The rods $s^7$ $s^7$ are secured to the frisket-carriage in such manner as to allow of their being conveniently removed or replaced. Slide-bolts or spring-catches may be used for this purpose. When the second sides of the sheets are being printed, it is necessary to provide the blankets with "set-off" sheets.

These may be pinned to the blankets, so as to be easily and frequently changed, in order to prevent "smutting" the work; or in case the tympan-frame should be used, the set-off sheets may be secured in place by paste applied about their edges.

The operation of the machine is as follows: The fountain being supplied with ink, and all parts being ready for use, the platen is first to be moved from over the bed, and the form properly placed and secured upon said bed. Next, the platen is to be returned to its place. The bolts which sustain the impression are next to be adjusted so as to produce the right degree of impression, after which the machine may be run a few minutes without giving impressions, in order to have the surfaces of the inking-rollers suitably covered with ink. Now, suppose the machine to be at the point in its operation shown in Figs. 1 and 2, the frisket $n^7$ having just arrived at its place of rest for receiving a sheet to be printed. In case the feed-frames are to be used, a sh et will have been pointed upon one of them while the frisket to which it belongs was coming to its place of rest, so that the said feed-frame may be turned down upon the said frisket to deliver the said sheet, and then lifted from it while the frisket remains stationary. This may be done by the right hand of the person who points the sheets while he or she with the left hand removes the sheet from said frisket which may have been previously printed; or, the said feed-frames may be turned down upon the friskets by the mechanism of the machine, as hereinbefore stated. When the movement comes for the frisket which has now received a sheet to start on its way into the press, in order that the said sheet may receive an impression, the arm $o^4$ will come in contact with the outer end, of $o^3$, of the rocking bar, and will carry it around with shaft $o$ and the crank $n^{13}$ until one half of a revolution has been performed, giving the frisket-carriage its entire motion in one direction, and carrying the inking-rollers $k^6$ $k^6$ over the type, so as to ink the form and bring the said rollers to their places for receiving a new charge and distribution of ink from and upon the distribution-cylinders $k^5$ $k^5$. At the same time and by the same operation the frisket which has just received a sheet will be carried to the point in the press where the impression is to be produced, and the other frisket will be carried to the other end of the machine, where it is to rest and receive a sheet in manner just described. The moment the friskets arrive at their places of rest, the rocking bar $o^8$ is disengaged from the arm $o^4$, and while the said arm is performing the half of a revotion, in which the said frisket-carriage is not moved by it, the bed, by the action of the crank D and pitman D′, will be raised and an impression produced, and the bed will be again lowered down to its place of rest. During this operation another sheet will have been pointed and laid upon the frisket exposed for the purpose, in manner aforesaid; and just before the completion of the said operation the said rocking bar $o^3$ will be again acted on by the arm $o^4$, and the frisket-carriage by that means will be moved as aforesaid, only in the opposite direction, and all the operations will be repeated consecutively, the machine thus receiving alternately the sheets to be printed and delivering them printed in the same order as they are received.

By the devices herein described, of connecting a reciprocating frisket-carriage (said frisket-carriage carrying a frisket at each end of it, and the inking-rollers $k^6$ $k^6$ on its central part,) with the feed-frames attached to each end of the machine and acting in conjunction with the said frisket-carriage, I am enabled to produce a very large amount of printed work at a small comparative amount of cost for machinery, for by thus feeding sheets and delivering them printed on both sides of one platen I make an approach to the facilities afforded by the employment of two separate and distinct beds and platens arranged so as to be fed with and to deliver sheets from only on one side.

What I claim, and desire to secure by Letters Patent, is—

1. The method herein described, or any other substantially the same, for giving the bed its proper periods of motion and rest, and producing impressions by means of the combination consisting of the crank D, the pitman D′, the declension-lever $i^5$ $i^6$, and the toggle-joints $e'$ $e'$.

2. The within-described method, or any equivalent mechanism, for giving the proper periods of motion and rest to the frisket-carriage, and each and all the parts attached to it, by means of the combination consisting of the arm $o^4$, the rocking bar $o^3$, the inclined plane by which saidbar is disengaged, the shaft $o$, and the crank $n^{13}$.

3. The combination of one or more feed-frames with the frisket or friskets, or mechanism for receiving the sheets to be printed, the same being substantially as herein set forth.

4. The within-described mode, or any other essentially the same, of securing against the platen the sheet to be printed, whereby it is not only kept steady and prevented from bagging, but is also, after the production of an impression upon it, separated from the types in a proper and safe manner.

5. Constructing the pitman as herein described, or in any manner substantially the same, the bearing-surface $i'$, the shoulder $i^2$, and the joint $h^5$ constituting its essential characteristics, so as to allow said pitman to be operated and to produce effects in the manner substantially as herein specified.

6. In combination with the within-described mechanism for producing the impressions, the treadle $k^4$, or its equivalent, to prevent impressions being taken or produced while other parts of the press are in motion, whenever such prevention may be desirable.

7. The combination of the double-frisket carriage, the bed, platen, and the rollers for inking the type, with two sets of inking mechanism, the whole being made to operate together substantially as herein explained, and the several parts being constructed and connected substantially as herein set forth.

8. The combination consisting of the platen, (when constructed substantially as herein stated,) the bed, and distribution-cylinders.

9. The combination of a crank with the carriage $n^6$, for the purpose of carrying the inking-rollers over the form, and for giving the friskets $n^7$ their proper motions and periods of rest.

10. The mode of constructing the winter E or bottom bar, as shown in Figs. 8 and 34, or any equivalent device, by which inconvenient height in the machine is avoided, said winter being made with a ledge or shoulder near its lower part, upon which the toggle joints are sustained, substantially as herein described.

11 The combination of the fountain with one or more distribution-cylinders and a traveler, L, the same being for the supply and distribution of the ink, substantially as herein described.

12. Placing the apparatus for the supply and distribution of ink so that the distribution-cylinders rest over or nearly over the fountain, the roller which takes the ink from the fountain-roller being placed between the fountain and the cylinders $k^5$ $k^5$, in the manner substantially as herein shown.

13. The mode herein described of laying the ink upon the types by passing the rollers $k^6$ $k^6$ between the bed and platen, said rollers being brought to a stand in their horizontal movement, for the purpose of receiving their supply of ink from a cylinder cylinders, substantially as herein stated.

14. The within-described mode by which the nuts $g'$ $g'$, which sustain the impression, are brought to their proper positions and secured there—that is, by the hoops $g^2$, set-screws $g^3$, and pins $g^5$, substantially as specified.

15. The mode of producing the impressions by means of toggle-joints applied to the under or reverse side of the bed, substantially as herein described.

16. The combination of the rocker-shaft $d^2$, and the levers $d'$ with the bed, the same being for the purpose of keeping the bed level, substantially as herein described.

ISAAC ADAMS.

Witnesses:
JOSIAH HINCKLEY, Jr.
J. AVERY RICHARDS.